Figure 1:
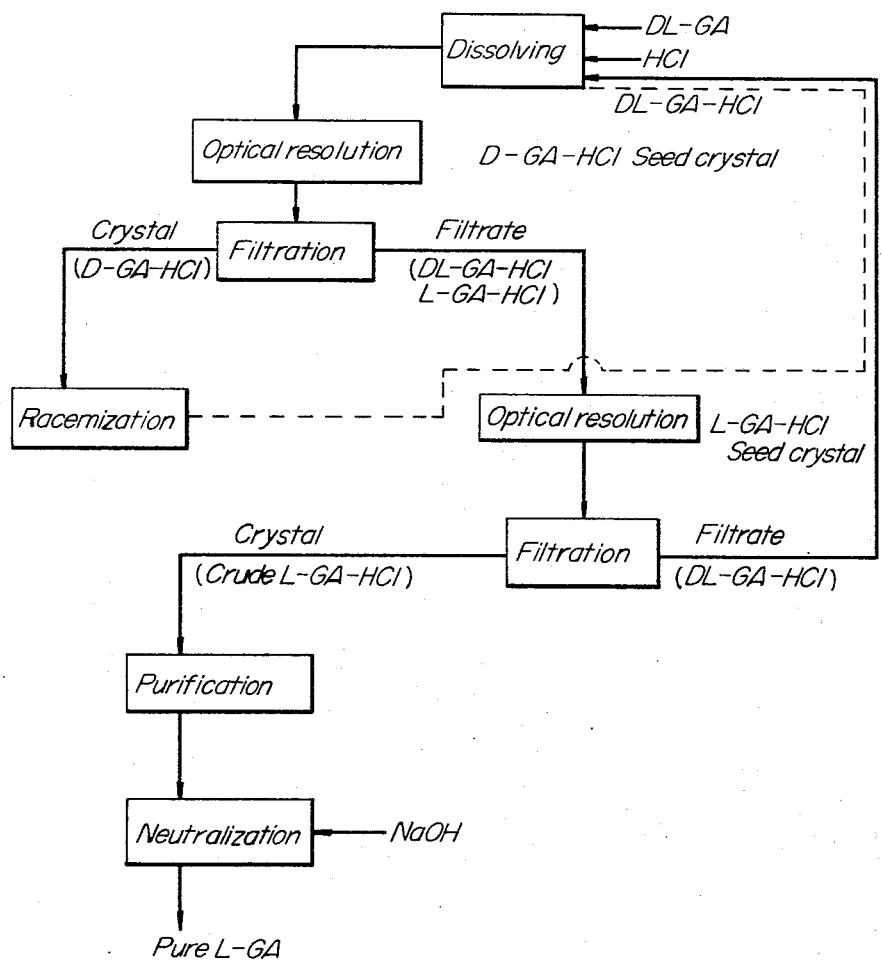

3,361,810
PROCESS FOR TREATING GLUTAMIC ACID SALTS

Gentaro Noyori, Hidemoto Kurokawa, and Teiko Watanabe, Tokyo, Japan, assignors to The Noguchi Institute, Tokyo, Japan, a corporation of Japan
Filed Mar. 23, 1964, Ser. No. 354,034
Claims priority, application Japan, Mar. 22, 1963, 38/13,593; Mar. 25, 1963, 38/15,047
11 Claims. (Cl. 260—534)

This invention relates to a process of treating glutamic acid salts. More particularly, this invention relates to a process comprising bringing together an optically active glutamic acid salt or a mixture thereof with the corresponding racemic salt, and racemic free glutamic acid in an aqueous medium and effecting an interaction between them which results in an equilibrium condition wherein the optically active glutamic acid salt is converted into the free acid form while the free racemic acid is converted to the corresponding salt.

It is well known that glutamic acid exists in D- and L-optically active forms as well as the racemic or DL form. Of these forms, only L-glutamic acid is of economic importance at present time, there being little known utility for D or DL glutamic acid.

Chemical processes for the synthesis of glutamic acid having invariably resulted in the formation of the racemic form, a simple, inexpensive method is needed for resolving the DL-glutamic acid and obtaining pure, optically active L-glutamic acid. The present invention is an improvement upon conventional resolution methods and treatment of optically active glutamic acid salt.

A variety of methods have been proposed for achieving resolution of racemic glutamic acid, which essentially employ seed crystals for fractional crystallization. It is preferred when resolving racemic glutamic acid that the racemic glutamic acid be used in the form of salts such as hydrochloride or ammonium salt rather than in the form of the free acid, since the solubility of the salt is higher than that of the free acid, thus increasing the yield per unit solution.

The conventional processes for recovering both optically active isomers through resolution of racemic glutamic acid in the form of salts may be summarized as follows: Free racemic acid is converted to racemic salt with an acid or an alkali, and dissolved in water to a state of supersaturation, the supersaturated solution of racemic salt being seeded with crystals of the desired optically active glutamic acid salt, either L- or D-form, so as to cause development and growth of crystals of the optically active isomer. The crystals are separated from the mother liquor, more racemic salt may be added to the mother liquor and the mother liquor is similarly treated whereby another optically active isomer is recovered; the mother liquor is used in the next resolution by dissolving racemic glutamic acid salts therein. The recovered crystals of both optically active isomers are respectively freed of any contaminating racemate if necessary, and neutralized to yield the optically pure isomer in free form.

The above described conventional processes have revealed the disadvantages of requiring the paired operations and paired equipment for adding seed crystals, growing and separating crystals, removing contaminating racemate, neutralizing the free acid and removing inorganic salt resulting from neutralization and of consuming acid or alkali equivalent to the optically active glutamic acid. Japanese Patent No. 1,271,173, U.S. Patent No. 2,882,302 and Japanese patent publication No. 14,708/62 have proposed processes for separating a mixture of racemic glutamic acid and optically active glutamic acid; the former two are carried out using the sodium salt and the latter, ammonium salt. In either method, ammonia or sodium hydroxide was necessary for preparing the acid in the desired state. In a conventional process of neutralization to obtain free glutamic acid from the corresponding salt there was produced undesired inorganic salt, which necessitated a step for removing inorganic salt such as NaCl or NH$_4$Cl, a by-product of neutralization.

The object of this invention is to provide a process for achieving resolution of racemic glutamic acid which is an improvement over the heretofore known processes in that there are fewer and simpler steps of operation and there is neither consumption of acid nor alkali.

Another object of this invention is to provide a process for converting an optically active glutamic acid salt into free acid without using acid or alkali. Another object of this invention is to obtain the solution of pure racemic glutamic acid salt.

Still another object of this invention is to provide a process for separating a mixture of a salt of an optically active isomer and the corresponding salt of racemic acid to obtain an optically active form as crystals of free acid and racemic form in the form of a solution of the salt.

Still another object of this invention is to provide a process for resolving glutamic acid wherein the steps such as neutralization for converting salt to free acid and separation of racemate and an optically active isomer, may be conducted without consuming acid or alkali. Still another object of this invention is to provide a process for recovering one optically active isomer in the form of free acid and a solution of the racemic salt for the next resolution in a single step, said optically active isomer being the enantiomer of the crystals taken from the supersaturated solution of racemic salt resolved by selective crystallization.

A further object of this invention is to provide a process for resolving glutamic acid which process is employable on a commercial scale by virtue of reliable and reproducible results inasmuch as this method depends on an equilibrium state.

Other objects of this invention will become apparent from the following description and claims.

As a result of detailed investigation aimed at establishing an efficient method for the resolution of glutamic acid, we have now discovered that there occurs exchange of hydrochloric acid between an optically active glutamic acid hydrochloride and racemic free glutamic acid. The exchange of hydrochloric acid may be brought about when crystals of racemic free glutamic acid are added to an aqueous solution of an optically active glutamic acid hydrochloride, the former being converted into hydrochloride and dissolving in the solution, while an equivalent amount of the optically active isomer is converted to free acid. In such a case, the resulting optically active free glutamic acid crystallizes from the solution if the amount of water is suitably regulated.

Moreover, detailed study of a ternary system comprising an optically active free glutamic acid, racemic glutamic acid hydrochloride and water revealed that the optically active free glutamic acid cannot be dissolved in an aqueous solution saturated with racemic glutamic acid hydrochloride. The hydrochloric acid exchange reaction occurs after the gradual addition of crystalline racemic free glutamic acid to an aqueous solution containing an optically active glutamic acid hydrochloride either alone or together with racemic salt. By adding racemic free acid in an amount equivalent to the amount of a salt of an optically active isomer existing in the solution, all optically active salt is converted into the free form. If the amount of water is used to saturate the racemic glutamic acid hydrochloride resulting from the hydrochloric acid exchange reaction and the racemic hydrochloride originally existing in the solution, all optically active glutamic acid having changed from hydrochloride to free acid, may be caused to crystallize out of the solution. The optically active form as crystals, and the racemic salt as solution can be respectively obtained in pure state by separating the resulting slurry into solid liquid phases.

We have determined that the said salt exchanging interaction is possible between optically active glutamic acid salts (which satisfy the following solubility relations) and racemic free glutamic acid.

$$DL_s > L_s \text{ (or } D_s) > DL_f > L_f \text{ (or } D_f)$$

wherein $DL_s$, $L_s$ and $D_s$ represent the solubilities of the salts of racemic and optically active glutamic acids respectively and $DL_f$, $L_f$ and $D_f$, the solubilities of corresponding free acids.

The glutamic acid salts satisfying the above relationship are, for example, hydrochloride and ammonium salt, which are resolved by a method of selective crystallization, can now be resolved with higher yield per unit volume of solution than is possible with the free acid. Such salt exchange reaction may also occur with salts such as the sodium salt which doesn't satisfy the above relation, but the relation: $DL_s > L_f$ (or $D_f$). When crystals of free racemic glutamic acid are added to an aqueous solution of the optically active sodium glutamate, the optically active isomer crystallizes in the form of free glutamic acid, while the added racemate goes into solution in the form of the sodium salt.

Recovering an optically active glutamic acid in its free form according to this invention has the following advantages. Only an optically active free acid may be quantitatively obtained in a single step from the optical isomer in salt form either alone or mixed with racemate without using acid or alkali and without the occurrence of undesirable by-products such as sodium chloride and ammonium chloride.

The process of recovering an aqueous solution saturated with racemic glutamic acid salt according to this invention is important in cases where optical resolution utilizing selective crystallization is repeated. This is so because even though optical resolution is carried out, if even a small quantity of optically active isomer remains in the mother liquor from a preceding optical resolution, it is very difficult to determine the extent of resolution according to the remaining ratio of materials and to control the optical resolution at the present technical level. Therefore in cases where optical resolution is conducted on industrial scale it is extremely important for the repetition of optical resolution with reproducibility for one to be able to provide by simple operations that the mother liquor for a subsequent resolution be saturated with racemic isomer alone. We shall describe in further detail advantages of this invention which constitute improvements over the conventional processes of resolution.

The previously known method of optical resolution of racemic glutamic acid in the form of salts (for example United States Patent No. 2,987,543, No. 2,882,302 and British Patent No. 833,823) is explained in the following sentences with illustration of a case of optical resolution of glutamic acid, wherein DL-glutamic acid, L-glutamic acid and D-glutamic acid etc. are abbreviations for glutamic acid, and if hydrochloride is suffixed thereto, it represents hydrochloride salt (cf. FIG. 1).

Figure 2:
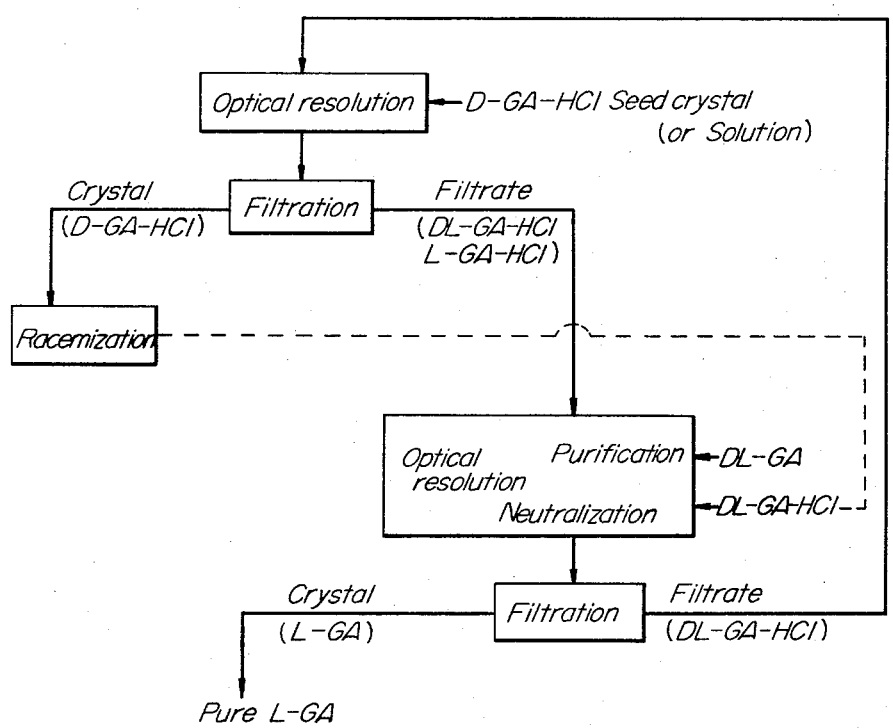

In the resolution according to the conventional process comprising seeding a supersaturated solution of racemic glutamic acid salt with crystals of an optically active isomer, making the seed crystals develop and grow in the solution and separating same from the solution while leaving the other isomer in the solution, the process of this invention may be advantageously employed in the following manner: Adding to the mother liquor from the resolution step containing the optical enantiomer of the recovered isomer, racemic glutamic acid salt; with crystals of racemic free glutamic acid in an amount equimolar to the amount of optically active salt remaining in the mother liquor, thereby effecting an equilibrium between those components by stirring; and regulating the temperature so as to cause the enantiomer in solution to crystallize thereby completely separating the crystals in the form of free acid in one step while simultaneously providing an aqueous solution of racemic glutamic acid salt for a subsequent resolution. If racemic glutamic acid salt in an amount equivalent to the amount of the optically active glutamic acid salt crystallized out of the solution by the preceding procedure is added to the mother liquor, the concentration of the racemic glutamic acid salt in the resulting solution becomes equal to the original concentration. According to this invention the following several steps of the conventional method may be married out quantitatively and reliably in a single step; recovering salt of optically active isomer left in the solution, removing contaminating racemate from crystallized optically active isomer, converting the salts to free acid, separating inorganic salt from the recovered optically active free acid and preparing the solution for a subsequent resolution (cf. FIG. 2).

Still more, since the present process depends on an equilibrated condition, the separation of solid and liquid phases may be conducted at any desired time after equilibrium has been attained, thus the process can be advantageously employed on a commercial scale. When the L- and D-isomers are both desired in the form of free acids, the first obtained salt of optically active isomer is mixed with water and an equivalent amount of crystalline racemic free glutamic acid to yield crystals of the optically active free glutamic acid, and the resulting crystals are recovered from the solution. The crystals of racemic glutamic acid salt may be recovered by cooling or evaporating the solution of racemic glutamic acid salt obtained at the same time. Acid or alkali borne by these crystals of salt from the resolving solution may be recycled to the resolution system by adding these crystals of racemic salt to the mother liquor of the resolution.

If only one optically active isomer (L-isomer, for example) is desired, the undesirable isomer (D-isomer, for example) obtained by above described process may be racemized according to known processes and subsequently resolved.

In either case, the resolution according to the process of this invention carried out using salts results in the advantages of higher yield per unit solution volume, and consuming neither acid nor alkali throughout the process. Also, in the process of this invention, the resolution and several processes accompanying the resolution are commercially advantageous by virtue of the fewer steps involved in the resolution when compared to the conventional processes.

The objects of this invention may be achieved either by introducing racemic free glutamic acid to an aqueous solution containing an optically active glutamic acid salt or by mixing crystals containing an optically active glutamic acid salt together with crystals of racemic free acid and water and bringing about a state of equilibrium to the solution through procedures such as stirring, heating or cooling and finally separating the solid phase from the liquid phase.

The operative conditions for conducting this invention will be described in further detail.

The otptically active glutamic acid salt to be treated and the racemic free glutamic acid used for the treatment need not necessarily be substantially pure in so far as they do not contain another optically active isomer and salt of different kind. The racemic free glutamic acid may be either monohydrate or anhydrate or a mixture thereof. An optically active free glutamic acid is added as seed crystals to the solution in order to obtain better results. When only an aqueous solution of racemic glutamic acid salt is desired, racemic free glutamic acid in an amount equal to, or greater than the amount of the optically active glutamic acid salt in solution is employed to bring about a solution which is just saturated or more than saturated with racemic glutamic acid salt. For this purpose, water may be added, or the solution may be concentrated if the water content may be changed, the temperature may be regulated to give an approximately saturated solution if the temperature may be varied or the same kind of racemic glutamic acid salt may be added when the solution is not yet saturated with the racemate and the temperature cannot be changed in such a case so as to obtain a solution saturated at a specified temperature.

When crystals of an optically active free glutamic acid of extremely high purity are desired, racemic free glutamic acid should be used in an amount equal to or less than the amount of the optically active salt in solution so as to give a solution either saturated or not saturated with racemic glutamic acid salt by regulating the amount of water, the temperature, or the amount of racemic glutamic acid salt added. For obtaining pure crystals, lower temperatures and concentrations are preferable since the decrease in purity due to adsorption of mother liquor onto the crystals may be prevented and the separation of crystals may be achieved with ease. The practically preferable range of temperature is ambient temperatures from 25° to 30° C.

For preventing a decrease in purity due to adsorption of the mother liquor onto crystals, ketones of 3 to 7 carbon atoms and alkanols of 1 to 5 carbon atoms may be used in mixture with water.

The ketones or alkanols are preferably used in an amount less than the amount of water by volume.

For obtaining racemic glutamic acid salt in an aqueous solution as well as an optically active free glutamic acid in crystalline form, both being in a state of sufficiently high purity, the racemic free acid in an amount approximately equivalent to the salt of the optically active isomer should be introduced and the amount of water, the temperature, or the amount of racemic glutamic acid salt added should be regulated so as to produce a solution approximately saturated with racemic salt. The operating temperature may be selected according to the purpose of using the aqueous solution of racemic glutamic acid salt obtained by the above process, for example, higher temperatures, limited to about 80° C., are advantageous for the efficient recovery of crystalline racemic glutamic acid salt with high efficiency. Temperatures within the range of 40° to 70° C. are preferred for affording an aqueous solution saturated with racemic salt to be utilized in the resolution, operating in the temperature range of 10° to 50° C.

The period of time required for attaining an equilibrium condition, though somewhat variable according to the crystal size of racemic free glutamic acid and the stirring speed, is in the range of 5 to 60 min. However, since the resulting state is an equilibrium condition, the system may be allowed to stand for longer periods of time.

The process of this invention will be described in further detail by referring to the following specific embodiments which are however set forth by way of illustration and are not intended for limitation.

*Example 1*

To 648 g. of an aqueous solution of DL-glutamic acid hydrochloride and D-glutamic acid hydrochloride (the concentration of the racemate being 48 g. per 100 g. of water, and the D-isomer being 32 g. per 100 g. of water) was added 75 g. of racemic glutamic acid anhydrate at the rate of 7.5 g. per minute with stirring in a bath maintained at 44° C. Three minutes after the end of the addition, the resulting crystals were filtered and washed twice with 50 g. of cold water (5° C.) and dried.

The recovered crystals weighed 67.1 g., exhibited $[\alpha]_D^{18}=31.9°$ and consisted of nearly completely pure D-glutamic acid.

*Example 2*

To 1.07 kg. of an aqueous solution of DL-glutamic acid hydrochloride (containing 4.3% of L-isomer), containing 123 g. glutamic acid hydrochloride per 100 g. water, were added 100 g. of DL-glutamic acid anhydride and 30 g. of crystalline of L-glutamic acid at 65° C. and stirred vigorously in a bath maintained at 60° C. for 10 minutes and filtered.

The concentration of the resulting aqueous solution of glutamic acid hydrochloride was 123 g. per 100 g. of water and its optical rotation was found to be almost zero.

*Example 3*

To 1.08 kg. of an aqueous solution of monoammonium DL-glutamate and monoammonium D-glutamate (containing 528 g. of monoammonium glutamate as anhydride, 24% being D-isomer) were added 121.5 g. of DL-glutamic acid anhydride and 71.4 g. of monoammonium DL-glutamate monohydrate and 20 g. of D-glutamic acid at 20° C.

After stirring for 30 minutes at 20° C., the resulting crystals were filtered and washed with 50 cc. cold water at 5° C. and with 100 cc. of cold methanol and dried.

The recovered crystals weighed 140.8 g., exhibited $[\alpha]_D^{18}=31.8°$ and consisted of almost completely optically pure D-glutamic acid.

On the other hand, the aqueous solution of monoammonium glutamate obtained at the same time had a concentration of 108 g. as anhydride per 100 g. of water and its optical rotation was found to be zero.

*Example 4*

To 250 g. of L-glutamic acid hydrochloride dissolved in 350 g. of water were added 226 g. of DL-glutamic acid monohydrate with stirring for 30 min. at 40° C., after which, stirring was continued for 1.5 hrs. in a bath kept at 25° C.

The resulting crystals were filtered, washed and dried. The obtained crystals of free L-glutamic acid weighed 198.5 g. and had 99.8% purity as free glutamic acid and exhibited $[\alpha]_D^{18}=+31.6°$.

The mother liquor was an aqueous solution consisting substantially of racemate and contained 247 g. of DL-glutamic acid hydrochloride.

*Example 5*

88 g. of crystalline of D-glutamic acid hydrochloride and 70.4 g. of crystalline DL-glutamic acid monohydrate were mixed in 200 g. of water, and stirred for 30 min. at 15° C.

The resulting crystals were filtered, washed and dried. 67.2 g. of resulting crystals were pure free D-glutamic acid and exhibited $[\alpha]_D^{18}=-31.9°$.

On the other hand an aqueous solution containing 85 g. of DL-glutamic acid hydrochloride was obtained as filtrate and consisting nearly completely of racemate.

*Example 6*

To 1 kg. of crystals consisting of 51% DL-glutamic acid hydrochloride and 49% of L-glutamic acid hydrochloride dissolved in 1.4 l. of water at 50° C. were added 440 g. DL-glutamic acid monohydrate crystals at the rate of 44 g. per minute with stirring, which stirring was continued for 1 hr. at 25° C.

The resulting crystals were filtered, washed and dried. The recovered crystals of L-glutamic acid weighed 390 g. and exhibited $[\alpha]_D^{18}=+31.8°$ and their optical purity was found to be 98.9%. As a filtrate, 2.35 kg. of an aqueous solution of DL-glutamic acid hydrochloride was obtained.

Example 7

100 g. of L-glutamic acid hydrochloride of 95% optical purity, 172 cc. of water, 100 cc. of acetone, and 68.5 g. of DL-glutamic acid anhydride were mixed and stirred for 40 min. at 10° C. and filtered. The crystals were dried without washing. The dried crystals weighed 61.7 g. and their optical purity was found to be 98.9%.

Example 8

A mixture of 25 g. of L-sodium glutamate monohydrate, 19.5 g. of DL-glutamic acid anhydride and 100 g. of water was stirred for 2 hrs. at 37° C. The resulting crystals were filtered, washed with cold water and dried. The dried crystals weighed 17.2 g. and their optical purity was found to be 100%.

Example 9

A mixture of 60 g. of monoammonium L-glutamate monohydrate, DL-glutamic acid monohydrate and 100 g. of water was stirred for 2 hrs. at 37° C. The resulting crystals were filtered, washed with cold water and dried. The dried crystals weighed 28.1 g. and the purity as glutamic acid was found to be 99.8%. The optical purity was found to be 99.1%.

Example 10

To an aqueous solution of glutamic acid hydrochloride (containing 100 g. of DL-glutamic acid hydrochloride and 150 g. of L-glutamic acid hydrochloride) were added 120 g. of DL-glutamic acid anhydride at 5° C. and stirred for 10 min. at that temperature. Then 23.5 g. of DL-glutamic acid hydrochloride crystals were added and further stirred for 20 min. at 5° C. and filtered.

The resulting crystals were washed with 200 cc. of cold aqueous acetone and dried. The dried crystals weighed 119.3 g., contained 99.3% L-isomer and consisted of almost pure free L-glutamic acid.

On the other hand the concentration of the mother liquid obtained at the same time was found to be 54.7 g. as anhydrate per 100 g. of water. An aqueous solution of pure DL-glutamic acid hydrochloride was obtained.

Example 11

1 kg. of L-glutamic acid hydrochloride (96.3% optical purity) was stirred in 960 g. of water kept at 50° C. When the temperature of the resulting slurry became 50° C., 771 g. of crystalline DL-glutamic acid anhydride were added and stirred vigorously. After 5 min., the crystals were separated by centrifugation. The crystals were washed twice with 200 cc. of ice water and dried.

The resulting crystals weighed 77.3 g. and their optical purity was 100%. On the other hand, the mother liquid was cooled to 5° C. and crystallized in an ice box over night, filtered and dried. The resulting crystals weighed 466 g. and consisted of almost pure DL-glutamic acid hydrochloride.

Example 12

To 197.7 g. of an aqueous solution of DL-glutamic acid hydrochloride (97.7 g. per 100 g. water) was added seed crystals of D-glutamic acid hydrochloride at 30° C. and stirred for 40 min. at 30° C. The resulting crystals were filtered and washed with a small quantity of ice water and dried. The dried crystals weighed 19.5 g., and contained 97.0% of D-glutamic acid hydrochloride.

To the mother liquid was added 11.8 g. of DL-glutamic acid monohydrate and 13.6 g. of DL-glutamic acid hydrochloride with stirring for 2 hrs. at 45° C. The resulting crystals were filtered off and were washed with ice water and dried. The crystals weighed 9.6 g. had 100% purity as glutamic acid, exhibited $[\alpha]_D^{18} = +31.8°$ and consisted of nearly pure free L-glutamic acid. On the other hand, the concentration of the mother liquor was 97.1 g. of glutamic acid hydrochloride per 100 g. of water, and the optical rotation was found to be zero. The solution was saturated with DL-glutamic acid hydrochloride.

Example 13

504 g. of a saturated aqueous solution of monoammonium DL-glutamate at 50° C. (concentration of monoammonium DL-glutamate being 152 g. per 100 g. water as an anhydride) was cooled to 30° C. and seeded with 15 g. of crystals of monoammonium D-glutamate monohydrate and stirred for 13 min. and filtered. The resulting crystals weighed 45.1 g. and their optical purity was found to be 95.0% and contained 42.8 g. of pure monoammonium D-glutamate monohydrate and weighed 27.8 g. in excess of the added seed crystals.

To the mother liquor from above resolution were added 27.4 g. of DL-glutamic acid monohydrate and the solution was heated to 50° C., cooled at 15° C., and kept for 30 min. at 30° C. The resulting crystals were filtered and washed with cold water. The dried crystals weighed 21.6 g. and exhibited $[\alpha]_D^{18} = +31.8°$ and were found to be almost pure, free L-glutamic acid. The optical rotation of the mother liquor was found to be almost zero, and the concentration of ammonium glutamate was 126.5 g. per 100 g. of water.

Example 14

1.02 kg. of a saturated aqueous solution of DL-glutamic acid hydrochloride at 50° C. was cooled to 30° C. and seeded with 20 g. of −100 mesh D-glutamic acid hydrochloride and stirred for 11 min. and filtered. The dried crystals weighed 85.2 g. and their optical purity was found to be 96.2%. To the mother liquor were added 65.2 g. of DL-glutamic acid hydrochloride and 50 g. of DL-glutamic acid anhydride with stirring for 15 min. at 50° C.

The resulting crystals were filtered and washed with methanol and dried. The dried crystals weighed 49.1 g. and consisted of almost pure L-glutamic acid. On the other hand, the optical rotation of the mother liquor was found to be zero, and the concentration of glutamic acid hydrochloride was 103.8 g. per 100 g. water.

What is claimed is:

1. A process for obtaining crystalline optically active free glutamic acid and an aqueous solution saturated with a salt of racemic glutamic acid, said salt being selected from the group consisting of hydrochloride, ammonium and sodium salts, said process comprising contacting said salt of an optically active glutamic acid, or a mixture of said salt and a salt of racemic glutamic acid with an approximately equivalent molar amount of free racemic glutamic acid in water at a temperature of 0–80° C., whereby migration of the salt between the free racemic glutamic acid and the salt of the optically active glutamic acid occurs, and a mixture is formed, said mixture comprising a crystalline solid phase of optically active free glutamic acid and an aqueous solution phase, maintaining said mixture at 0–80° C. until equilibration of the solid and aqueous phases occur, and separating said solid and aqueous phases.

2. A process as claimed in claim 1 wherein the obtained crystalline optically active free glutamic acid is pure when the molar amount of free racemic glutamic acid is 0.5–1 mole per mole of salt of optically active glutamic acid.

3. A process as claimed in claim 1, wherein the obtained aqueous solution saturated with said salt of racemic glutamic acid is pure when the molar amount of free racemic glutamic acid is 1.0–1.5 moles per mole of salt of optically active glutamic acid.

4. A process as claimed in claim 1, wherein the salt of optically active glutamic acid contains a member selected from the group consisting of free racemic glutamic acid, said salt of said racemic glutamic acid, and said optically active glutamic acid in free form.

5. A process as claimed in claim 1, wherein the free racemic glutamic acid contains a member selected from the group consisting of said salt of said optically active glutamic acid, said salt of racemic glutamic acid, and said optically active glutamic acid in free form.

6. A process as claimed in claim 1, wherein the free racemic glutamic acid is selected from the group consisting of free racemic glutamic acid monohydrate, free racemic glutamic acid anhydrate, and a mixture thereof.

7. A process as claimed in claim 1 comprising adding to the water a compound selected from the group consisting of ketones of 3–7 carbon atoms and alkanols of 1–5 carbon atoms.

8. A process as claimed in claim 7, wherein the compound added is of less volume than the volume of the water.

9. A process for obtaining an aqueous solution saturated with a salt of racemic glutamic acid from an unsaturated solution of a mixture of a salt of racemic glutamic acid and a salt of an optically active glutamic acid, said salts being selected from the group consisting of hydrochloride and ammonium salts, which process comprises adding to the said solution free racemic glutamic acid in a molar amount substantially equivalent to said salt of an optically active glutamic acid, whereby migration of the salt between said salt of an optically active glutamic acid and the thusly added free racemic glutamic acid occurs, and effecting saturation of said solution with said salt of racemic glutamic acid by adding to said solution crystals of said salt or racemic glutamic acid.

10. A process for treating an aqueous solution saturated with a salt of racemic glutamic acid, said salt being selected from the group consisting of hydrochloride and ammonium salts, which process comprises adding to said solution seed crystals of said salt of one optically active glutamic acid, said seed crystals causing crystallization of said salt of said one optically active glutamic acid, separating the thusly formed crystals from the solution, said solution containing said salt of racemic glutamic acid at a concentration less than saturation and said salt of another optically active glutamic acid, adding to said solution crystals of free racemic glutamic acid in an amount substantially equal to that of the salt of the other said optically active glutamic acid at a temperature of 0–80° C., whereby migration of the salt between the thusly added free racemic glutamic acid and the salt of said another optically active glutamic acid occurs, which migration causes said solution to become saturated with said salt of racemic glutamic acid, and causes crystallization of free said another optically active glutamic acid, and separating the thusly formed crystals from the solution, said solution being saturated with said salt of racemic glutamic acid.

11. A process for treating an aqueous solution saturated with a salt of racemic glutamic acid, said salt being selected from the group consisting of hydrochloride and ammonium salts, which process comprises adding to said solution seed crystals of said salt of one optically active glutamic acid, said seed crystals causing crystallization of said salt of said one optically active glutamic acid, separating the thusly formed crystals from the solution, said solution containing said salt of racemic glutamic acid at a concentration less than saturation, and said salt of another optically active glutamic acid, adding to said solution crystals of free racemic glutamic acid and crystals of said salt of racemic glutamic acid, both in an amount substantially equal to that of the salt of the said another optically active glutamic acid at a temperature of 0–80° C., whereby migration of the salt between the thusly added free racemic glutamic acid and the salt of said another optically active glutamic acid occurs, which migration causes said solution to become saturated with said salt of racemic glutamic acid, and causes crystallization of free said another optically active glutamic acid, and separating the thusly formed crystals from the solution, said solution being saturated with said salt of racemic glutamic acid.

References Cited
FOREIGN PATENTS
1,335,192   7/1963   France.

OTHER REFERENCES
Akashi, J. Chem. Soc. of Japan, vol. 83, pp. 417–425 (April 1962).

LORRAINE A. WEINBERGER, *Primary Examiner.*

A. P. HALLUIN, *Assistant Examiner.*